United States Patent [19]

Chu et al.

[11] Patent Number: 4,962,076
[45] Date of Patent: Oct. 9, 1990

[54] SILICONE SEALANTS HAVING REDUCED COLOR

[75] Inventors: Hsien-Kun Chu; Russell P. Kamis, both of Midland; Jerome M. Klosowski, Bay City; Loren D. Lower, Midland, all of Mich.

[73] Assignee: Dow Corning Corporation, Midland, Mich.

[21] Appl. No.: 418,074

[22] Filed: Oct. 6, 1989

Related U.S. Application Data

[62] Division of Ser. No. 276,977, Nov. 28, 1988, Pat. No. 4,906,719.

[51] Int. Cl.$^5$ .............................................. B01J 31/22
[52] U.S. Cl. .................................... 502/158; 502/168
[58] Field of Search ............................... 502/158, 168

[56] References Cited

U.S. PATENT DOCUMENTS

| | | | |
|---|---|---|---|
| 3,845,161 | 7/1974 | Beers | 528/17 |
| 4,391,937 | 3/1983 | Falender et al. | 524/119 |
| 4,438,039 | 3/1984 | Beers | 528/17 |
| 4,487,907 | 12/1984 | Fukayama et al. | 528/32 |

FOREIGN PATENT DOCUMENTS 166344 11/1985 Japan.

Primary Examiner—Patrick P. Garvin
Attorney, Agent, or Firm—Edward C. Elliott

[57] ABSTRACT

A chelated titanium catalyst can be improved by the addition of an additive selected from the group consisting of organomercaptan of the formula RSH, where R is a hydrocarbon radical containing from 3 to 12 carbon atoms, and mercapto containing silane of the formula HSR'SiX$_3$, where R' is a divalent hydrocarbon having from 1 to 8 carbon atoms and X is alkoxy radical having 1 to 6 carbon atoms. The improved composition has a reduced tendency to develop color upon storage. The improved composition is particularly useful in a silicone composition comprising a hydroxyl endblocked polydiorganosiloxane and an alkoxysilane or mixture of alkoxysilanes, or in a silicone composition comprising an alkoxy endblocked polydiorganosiloxane.

5 Claims, No Drawings

SILICONE SEALANTS HAVING REDUCED COLOR

This is a division of Ser. No. 276,977, filed 11-28-88, now U.S. Pat. No. 4,906,719.

BACKGROUND OF THE INVENTION

1. Field of the Invention

This invention relates to silicone sealants cured through alkoxy groups catalyzed with a chelated titanium.

2. Background Information

A number of silicone sealants have been developed which depend upon the use of a chelated titanium catalyst for accelerating the cure of the sealants through a reaction between alkoxy groups and the moisture in the air. These are one package sealants which are stable upon storage in the absence of air, but cure to an elastomer upon exposure to air. These compositions develop color upon storage. If the composition is colored at the time of manufacture due to the filler used or the presence of a pigment, the change in color may not be noticeable. However clear or translucent products are commercially desirable.

Compositions which make use of this curing reaction and which are stated to be color stable are described in U.S. Pat. No. 4,391,937, issued July 5, 1983.

SUMMARY OF THE INVENTION

Chelated titanium compound of the type useful for the catalysis of one part, room temperature curing silicone elastomeric compositions can be prevented from causing the formation of color upon storage by adding to the chelated titanium compound an additive selected from the groups consisting of organomercaptan compounds, such as dodecylmercaptan, and mercapto containing silanes, such as mercaptopropyltrimethoxysilane.

DESCRIPTION OF THE INVENTION

This invention relates to an elastomeric composition comprising (i) a hydroxyl endblocked polydiorganosiloxane and a silane or mixture of silanes having an average of from 2.01 to 4 inclusive alkoxy radicals, or an alkoxy endblocked polydiorganosiloxane, and (ii) a chelated titanium catalyst, wherein the improvement comprises the addition of an additive selected from the group consisting of organomercaptan of the formula RSH, where R is a hydrocarhon radical containing from 3 to 12 carbon atoms, and mercapto containing silane of the formula HSR'SiX$_3$, where R' is a divalent hydrocarbon having from 1 to 8 carbon atoms and X is alkoxy radical having 1 to 6 carbon atoms.

This invention also relates to a composition comprising a chelated titanium catalyst, of the type known to be useful in catalyzing the cure of alkoxy endblocked polydiorganosiloxane in the presence of moisture, and an additive selected from the group consisting of organomercaptan of the formula RSH, where R is a hydrocarbon radical containing from 3 to 12 carbon atoms, and mercapto containing silane of the formula HSR'SiX$_3$, where R' is a divalent hydrocarbon having from 1 to 8 carbon atoms and X is alkoxy radical having 1 to 6 carbon atoms.

One package silicone elastomeric compositions containing chelated titanium compounds develop color upon storage. If the composition is colored at the time it is manufactured because of the choice of filler used or because of pigments used, the change in color may not be noticeable. However, clear or translucent compositions are commercially desirable products. Chelated titanium catalysts cannot be used in such cases because the compositions develop a yellow, orange, or brown color on storage. The development of this color is not evident when other types of titanium catalysts are used, such as tetraalkoxytitanates. The tetraalkoxytitanates are often not satisfactory, however, due to other manufacturing difficulties and product difficulties, such as slower cure and increased degree of slump.

This invention relates to one package, room temperature curing silicone elastomeric compositions comprising a hydroxyl endblocked polydiorganosiloxane, a silane or silane mixture having an average of from 2.01 to 4 inclusive alkoxy radicals, a chelated titanium compound as described above, and an additive as described above, said elastomeric composition being stable under conditions excluding moisture and curable by exposure to moisture.

Chelated titanium compounds are used as catalysts in one package, room temperature curing silicone elastomeric compositions. Such elastomeric compositions are storage stable under conditions excluding moisture but cure into a silicone rubber upon exposure to moisture, for example, when they are extruded from their storage tube and exposed to the atmosphere. Many of these elastomeric compositions are commercially available for use as caulks and adhesives. Some of these elastomeric compositions are manufactured to yield a clear or translucent silicone rubber. In such compositions, a problem has arisen in that the composition develops varying degrees of color upon storage, making it impossible to obtain clear or translucent silicone rubber upon cure. It has been discovered that the color is due to the chelated titanium compounds which are used as the catalyst in these elastomeric compositions We have now found that the development of color upon storage can be controlled by the addition of the additives to the chelated titanium compound or to silicone elastomeric compositions containing the chelated titanium compound.

The chelated titanium compounds useful in this invention are those that are useful as catalysts in one package, room temperature curing silicone elastomeric compositions. The chelated titanium compounds and their method of manufacture are described in U.S. Pat. No. 3,334,067, issued Aug. 1, 1967, to Weyenberg; U.S. Pat. No. 3,689,454, issued Sept. 5, 1972, to Smith and Hamilton, Jr.; U.S. Pat. No. 3,708,467, issued Jan. 2, 1973, to Smith and Beers; and U.S. Pat. No. 3,856,839, issued Dec. 24, 1974, to Smith and Hamilton, Jr., said patents hereby being incorporated by reference to disclose chelated titanium compounds and their method of manufacture. Many of these chelated titanium compounds are commercially available.

This invention includes the use of the chelated titanium catalyst discussed above in an elastomeric composition comprising (i) a hydroxyl endblocked polydiorganosiloxane and a silane or silane mixture having an average of from 2.01 to 4 inclusive alkoxy radicals, and a chelated titanium catalyst. By adding the additive specified in this invention, the formation of color in the silicone elastomeric composition is inhibited.

The hydroxyl endblocked polydiorganosiloxane used in such silicone elastomeric compositions has a viscosity of at least 0.025 Pa.s at 25° C. and has the average formula

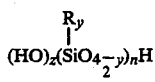

in which z has an average value from 1 to 1.01 inclusive, y has an average value from 1.99 to 2 inclusive and the sum of y and z is 3, R is selected from the group consisting of monovalent hydrocarbon radicals, halogenated monovalent hydrocarbon radicals, and monovalent cyanoalkyl radicals, all of from 1 to 18 inclusive carbon atoms and n is an integer. R is preferably a methyl radical.

The silane or mixtures of silanes used has the average formula $$R_mSi(OR^1)_{4-m}$$

in which R is as defined above. $R^1$ is selected from the group consisting of monovalent haloaliphatic hydrocarbon radicals having no halogen alpha to the oxygen and monovalent aliphatic hydrocarbon radicals, both of less than 5 carbon atoms. The value of m is from 0 to 3, and has an average value of from 0 to 1.99 based upon the total amount of silane in the composition. When a silane is used where m has a value of 0 or 1, the silane acts as

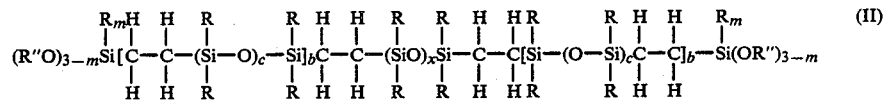

a cross-linking agent. When m has a value of 2, the silane is difunctional and acts as a chain-extending agent. In order for the silicone elastomeric composition to cure, the average value of m is from 0 to 1.99, with the preferred average value being about 1.0. The preferred silane is methyltrimethoxysilane.

An elastomeric composition of this invention can also be made using an alkoxy endblocked polydiorganosiloxane as (i), such as a polymer of the formula

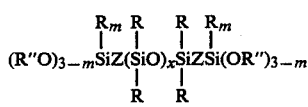

where each R is free of aliphatic unsaturation and is at least one selected from the group consisting of monovalent hydrocarbon, monovalent halohydrocarbon, and monovalent cyanoalkyl radicals of 1 to 18 inclusive carbon atoms, each R'' is at least one selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene propylene, hexylene, phenylene, and

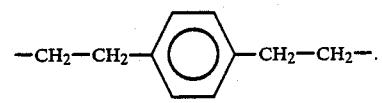

A preferred Z may be represented by the formula

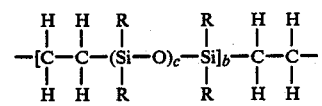

where R is as defined above, b is 0 or 1, and c is from 1 to 6. The preferred viscosity of polymer (1) is from 1 to 1000 Pa.S at 25° C. Lower viscosities give cured sealants which are very hard with high modulus because of the high amount of crosslinking while higher viscosities give sealants with a very low extrusion rare.

A preferred polymer is represented by the formula

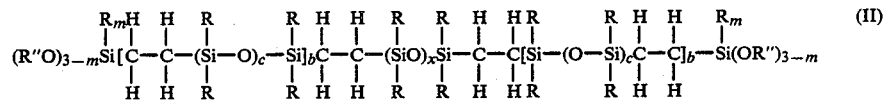 (II)

where R and R'' are as defined above, m is 0 or 1, b is 0 or 1, c is from 1 to 6 and x is such that the viscosity is from 0.5 to 3000 Pa.s at 25° C.

A preferred polymer, obtained when b is 0, is of the formula

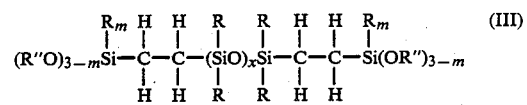 (III)

or, when b is 1 and c is 1, is of the formula

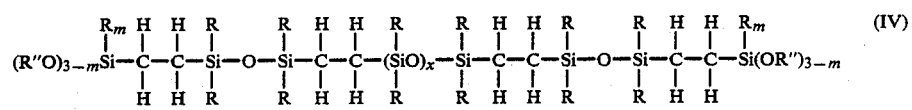 (IV)

where R and R'' are as described above. Methyl radical is preferred for R and R''. The radicals can be the same or combinations of the above where at least 50 mole percent of the radicals are methyl radicals.

The polymer of formula (II) can be manufactured by reacting a vinyl endblocked polydiorganosiloxane with an endcapping composition of the formula

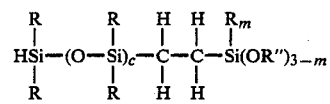

where R and R'' are as defined above, m is 0 or 1, and c is 1 to 6. This endcapping composition can be produced by a method comprising (A) mixing 1 mole of a composition (a) of the formula

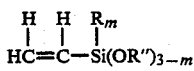

where R, R", and m are as defined above, with greater than 2 moles of a composition (b) of the formula

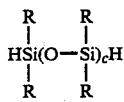

where R is as defined above and c is from 1 to 6, in the presence of a platinum catalyst and allowing to react, then, (B) optionally stripping the excess composition (b) from the product, to give an endcapping composition of the formula as given above. When c is equal to 1, the product obtained is the endcapping composition shown above which is used to produce the polymer of formula (IV). A preferred endcapping composition is that obtained when c is equal to 1 and m is equal to 0. The above endcapping composition its method of manufacture, and its use in the manufacture of silicone sealants, having an alkoxy functional silane crosslinker and a titanium catalyst, is taught in U.S. patent application No. 148,196, filed Jan. 28, 1988 and now U.S. Pat. No. 4,772,675, assigned to the assignee of the instant application, which is hereby incorporated by reference to show the endcapping composition, its manufacture, and its use.

The polymer of formula (III) may be produced by reacting a hydrogen endblocked polydiorganosiloxane with a silane of the formula

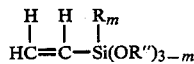

in the presence of a platinum catalyst such as chloroplatinic acid at a temperature of from 30° to 150° C. Methods of making these polymers are taught in U.S. Pat. No. 3,175,993, issued Mar. 30, 1965 to Weyenberg, which is hereby incorporated by reference to show methods of manufacturing polymer of formula (III).

The polymer of formula (IV) can be manufactured by reacting a vinyl endblocked polydiorganosiloxane with an endcapping composition of the formula

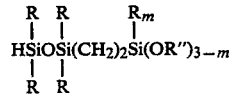

where R is as defined above, using a platinum catalyst to cause the materials to react. This endcapping composition is prepared by reacting $ViR_mSi(OR'')_{3-m}$, where Vi is vinyl radical, with $(R_2HSi)_2O$ in the presence of a platinum catalyst where only one end of the disilane is reacted. This can be done by combining 1 mole of the $ViR_mSi(OR'')_{3-m}$ with greater than 2 moles of the disilane. When this mixture is combined with a platinum catalyst, there is a slightly exothermic reaction after a few minutes at room temperature. The color changes from clear to light yellow. A byproduct will be present consisting of product produced by the reaction of $ViR_mSi(OR'')_{3-m}$ to both ends of the silane. This byproduct can be left in the material. At a 1 to 2 ratio, there is about 15 percent byproduct produced. If the ratio is changed to 1 to 4 the byproduct drops to about 5 percent. The excess silane is then stripped from the product. The product can be purified by distillation if desired.

A series of polymers similar to those shown above as polymers II, III, and IV can be produced where not all of the vinyl endblocking groups on the polydiorganosiloxane are reacted with an alkoxysilane. A polymer results in which, on average, some of the ends are vinyl endblocked and some of the ends are alkoxysilethylene endblocked. Useful materials have been produced in which on average from 3 to 40 percent of the endblocking groups are vinyl radicals and the remainder are alkoxysilethyene radicals. As an example, when the endcapping composition is of the formula

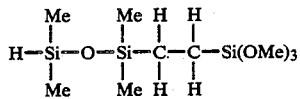

where Me is methyl radical and the vinyl endblocked polydiorganosiloxane is a polydimethylsiloxane having a viscosity of about 55 Pa.s at 25° C. then the degree of endblocking versus the amount of endcapping composition used can be estimated from the following:

| Parts by Weight of Encapper | Percent of Alkoxysilethylene Endblocks |
| --- | --- |
| 0.9 | 100 |
| 0.8 | 89 |
| 0.7 | 78 |
| 0.6 | 67 |
| 0.5 | 55 |

When these polymers having a portion of the endblocking present as vinyl radicals are formulated into moisture curing sealants, the modulus of the cured sealant is lower than if all of the endblocking groups were alkoxysilethylene groups. By adjusting the degree of endcapping the modulus of the resulting elastomer can be controlled at a desired level.

The above polymers can also be produced by using similar siloxanes and silanes in which the location of the hydrogen atom and the vinyl group which react together are reversed.

Many of the one package, room temperature curing silicone elastomeric compositions now known and commercially available are catalyzed with chelated titanium compounds. Such curable silicone elastomeric compositions and methods for their manufacture are disclosed in U.S. Pat. No. 3,334,067, issued Aug. 1, 1967, to Weyenberg; U.S. Pat. No. 3,499,859, issued Mar. 10, 1970, to Matherly; U.S. Pat. No. 3,689,454, issued Sept. 5, 1972, to Smith and Hamilton, Jr.; U.S. Pat. No. 3,708,467 issued Jan. 2, 1973, to Smith and Beers; and U.S. Pat. No. 3,926,896, issued Dec. 16, 1975, to Dumoulin, all of which are hereby incorporated by reference to show silicone elastomeric compositions and methods of their manufacture in which a chelated titanium catalyst is used.

The additive used in this invention is selected from the group consisting of organomercaptan of the formula RSH, where R is a hydrocarbon radical containing from 3 to 12 carbon atoms, and mercapto containing silane of the formula HSR'SiX₃, where R' is a divalent hydrocarbon having from 1 to 8 carbon atoms and X is alkoxy radical having 1 to 0 carbon atoms, such as methoxy, ethoxy, and phenoxy. The preferred organomercaptan has R as the dodecyl radical Dodecylmercaptan is a commercial product. The preferred mercapto containing silane is mercaptopropyltrimethoxysilane. This is a commercial product.

The method of manufacturing the silicone elastomeric compositions which are stable under conditions excluding moisture, but which cure upon exposure to moisture comprises mixing hydroxyl endblocked polydiorganosiloxane, a silane or silane mixture having an average of from 2.01 to 4 inclusive alkoxy radicals, a chelated titanium catalyst, and an additive of this invention, under conditions which substantially exclude moisture. When these ingredients are mixed, an interaction takes place that results in a material which is stable under conditions excluding moisture and which can be stored for prolonged periods of time. However, the material will cure spontaneously upon exposure to moisture including atmospheric moisture in a matter of a few minutes to a few hours to give a rubbery material. The nature of the product formed by mixing these ingredients in the absence of moisture is not precisely known. However, it is believed that the alkoxy groups on the silane react with the hydroxyl groups of the polydiorganosiloxane to produce siloxanes having end groups of the formula

with the elimination of alcohol. Since the silanes tend to hydrolyze upon contact with moisture, care should be taken to exclude moisture during the mixing and subsequent storage of the mixture. It is preferred that at least 1.0 mole of silane is present for each mole of silicon-bonded hydroxyl in the polydiorganosiloxane. The upper limit of the amount of silane employed is not critical. The use of greater than 1.0 mole of silane is preferred in order to protect the system from gelation due to the incidental presence of water which may be carried into the system by way of other ingredients such as fillers or stabilizing additives or which may diffuse into the system during storage.

To obtain a reasonable length of cure upon exposure to moisture, there should be sufficient titanium-containing composition of this invention to yield at least 0.1 part by weight of chelated titanium compound based on 100 parts by weight of polydiorganosiloxane. As much as 10 parts by weight of the chelated titanium compound or more can be used, but large amounts serve no useful purpose and may cause a slower cure and an increase in color. Preferred amounts are in the range of from 0.5 part to 2.5 parts by weight.

The additive present in the elastomeric composition of this invention inhibits the formation of color in the silicone elastomeric compositions. The amount of additive necessary in the silicone elastomeric composition is dependent upon, at least, the additive chosen, the amount and nature of the chelated titanium compound chosen and the degree of color change allowable. As more additive is used the color change upon storage becomes less.

The method of producing the silicone elastomeric composition is not critical, except the mixing must exclude substantial exposure to moisture. Preferably, the polydiorganosiloxane and filler are mixed along with other ingredients such as anti-crepe hardening agents, other fillers, etc. This base mixture can be heated and/or placed under vacuum to remove any moisture present. The dried base mixture is then combined with the silane and the titanium-containing composition (ii) having additive present. Any other liquid additives can be conveniently added by mixing with the silane and catalyst mixture and then combining the total mix with the base mixture. The silane, the chelated titanium compound (ii), and the additive can be added to the base mixture in any other desired order, either separately or in mixtures.

The silicone elastomeric composition can include other ingredients such as the fillers normally employed in silicone rubber, anticrepe-hardening agents to treat the filler, plasticizers to lower the durometer, and other ingredients to improve specific properties such as compression set additives oxidation inhibitors ultraviolet absorbers, and flame retardant additives. Care should be taken not to introduce appreciable amounts of moisture along with any of the added ingredients. The elastomeric composition can also be modified to reduce the time to cure by including a minor amount of carboxylic acid salt, alkoxide, and/or chelate of a metal ranging from lead to manganese, inclusive, in the electromotive series of metals.

The improved silicone elastomeric compositions of this invention are particularly useful where the composition is clear or translucent or of a light color. By using the titanium-containing composition of this invention in place of the chelated titanium catalyst per se in such silicone elastomeric compositions, the formation of color or a change of color upon storage is prevented or retarded. The silicone elastomeric compositions are useful in caulking applications, in coating applications, as adhesives, and as electrical insulation.

The following examples are included for illustrative purposes only and should not be construed as limiting the invention which is properly set forth in the appended claims.

EXAMPLE 1

An elastomeric composition 1, curable upon exposure to moisture was prepared by mixing in the absence of moisture 75 g of a polydimethylsiloxane having about 20 percent vinyl endblocks and about 80 percent —CH₂CH₂Si(OCH₃)₃ endblocks and a viscosity of about 60 Pa.s at 25° C., 5.2 g of methyltrimethoxysilane, 6.8 g of fume silica having a surface area of about 150 m²/g, and 1.5 g of 2,5-di-isopropoxy-bis-ethylacetoacetate titanium for 7 minutes.

Elastomeric composition 2 was prepared in the identical manner, except there was also added 0.38 g of mercaptopropyltrimethoxysilane.

Each composition was then stored for 7 days at 50° C., to simulate long time storage at room temperature, and observed for color change. Composition 1 was amber, while composition 2 was a straw color, showing that the mercaptosilane aided in preventing the formation of color upon storage.

EXAMPLE 2

A series of compositions were prepared by mixing chelated titanium catalysts with mercaptopropyltrimethoxysilane in the amounts shown in Table I. TBT is tetrabutyltitanate, EAA is ethylacetoacetate, TDI is 2,5-di-isopropoxy-bis-ethylacetoacetate titanium, and MPTM is mercaptopropyltrimethoxysilane The combination of tetrabutyltitanate and ethylacetoacetate forms a chelated titanium catalyst in situ.

Each composition was aged for 8 days at 50° C. and judged for color with the results shown in Table I.

TABLE I

| Composition | TBT | EAA | TDI | MPTM | Color | Rating |
|---|---|---|---|---|---|---|
| 21 | 8 | 3 | — | 2.5 | straw | 1 |
| 22 | 8 | 6 | — | 2.5 | straw | 2 |
| 23 | 8 | 6 | — | 0.5 | straw | 3 |
| 24 | 8 | 3 | — | — | straw | 4 |
| 25 | 8 | 6 | — | — | amber | 6 |
| 26 | — | — | 10 | 2.5 | amber | 5 |
| 27 | — | — | 10 | — | orange | 7 |

Rating, 1 is least color

EXAMPLE 3

A series of compositions were prepared in the manner of example 1, using a variety of organotrimethoxysilane additives.

Each composition was prepared by mixing as in example 1, 100 g of the polydimethylsiloxane of example 1 7 g of methyltrimethoxysilane, 2 g of 2,5-di-isopropoxy-bis-ethylacetoacetate titanium 0.27 g of a pigment slurry containing 10 percent blue pigment and 90 percent methyltrimethoxysilane, 9 g of the silica of example 1 and the additives shown in Table II, in that order Each composition was evaluated for peel adhesion to copper by a procedure based upon ASTM D 903. A layer of sealant about 1.6 mm thick of the sealant was applied to the cleaned surface of a copper or acrylic sheet. Then a piece of aluminum screen was laid over the sealant and another layer of sealant applied. The reinforced layer of sealant was allowed to cure for 14 days at room temperature and then was tested by measuring the force required to peel the reinforced layer from the substrate at a 180 degree angle. The percent of the surface which had adhesive remaining on it after the peel test is shown as % adhesion. The results are shown in Table II. The uncured sealants were stored for 4 weeks at 70° C. and observed for color change with the result shown in Table II.

TABLE II

| Composition | Additive | Amount g | Adhesion Copper #/% | Adhesion Acrylic #/% | Color |
|---|---|---|---|---|---|
| 31* | A | 0.3 | 2   0 | 8.5   100 | yellowgreen |
| 32* | B | 0.6 | 8   100 | —   — | bluegreen |
| 33 | C | 1.2 | 14   100 | 13.3   70 | blue |

A = 3-(2-aminoethylamino)propyltrimethoxysilane
B = glycidoxypropyltrimethoxysilane
C = 1/1 mole ratio of mercaptopropyltrimethoxysilane and tetrabutyltitanium mixed and aged 4 hours before adding to composition
* = comparative example

EXAMPLE 4

A series of compositions was prepared as in Example 3, but also having 1.5 parts of fumed silica having a surface area of about 90 m²/g and using the additives shown in Table III.

TABLE III

| Composition | Additive | Amount g | Adhesion Copper #/% | Adhesion Acrylic #/% | Color |
|---|---|---|---|---|---|
| 41* | A | 0.3 | 2   0 | 13.0   100 | dk brown |
| 42* | A | 0.3 |  |  |  |
|     | F | 0.7 | 2   0 | 14.0   100 | dk brown |
| 43* | D | 0.25 | 1   0 | 2-12   0 | dk brown |
| 44 | C | 1.2 | 16   100 | 16   100 | — |
| 45 | E | 0.5 | 13   100 | 0   0 | bluegreen |

A = 3-(2-aminoethylamino)propyltrimethoxysilane
C = 1/1 mole ratio of mercaptopropyltrimethoxysilane and tetrabutyltitanium mixed and aged 4 hours before adding to composition
D = aminopropyltriethoxysilane
E = mercaptopropyltrimethoxysilane
F = tetrabutyltitanium
* = comparative example

EXAMPLE 5

A composition was prepared by mixing 2.5 g of dodecylmercaptan with 10 g of 2,5-di-isopropoxy-bis-ethylacetoacetate titanium. Upon aging, it gradually turned a light yellow; the 2,5-di-isopropoxy-bis-ethylacetoacetate titanium without the additive turned orange.

EXAMPLE 6

A series of additives were evaluated in a base composition consisting of 99 parts of composition 1 of Example 1 and 1 part of titanium oxide by adding the amount of additive shown in Table IV. The compositions were given an accelerated aging by heating at 70° C. for 2 weeks, with the results shown in Table IV. The results were the same after 4 weeks aging.

TABLE IV

| Composition | Additive | Amount g | Color |
|---|---|---|---|
| Aged 2 weeks |  |  |  |
| 61* | A | 0.3 | 4 |
| 62* | A | 0.3 |  |
|     | F | 0.6 | 4 |
| 63* | F | 0.6 | 4 |
| 64 | E | 0.5 | 1 |
| 65 | E | 0.5 |  |
|    | F | 0.5 | 2 |
| 66 | C | 1.0 | 2 |

TABLE IV-continued

| Composition | Additive | Amount g | Color |
|---|---|---|---|
| 67* | — | — | 4 |

A = 3-(2-aminoethylamino)propyltrimethoxysilane
C = 1/1 mole ratio of mercaptopropyltrimethoxysilane and tetrabutyltitanium mixed and aged 4 hours before adding to composition
E = mercaptopropyltrimethoxysilane
F = tetrabutyltitanium
* = comparative example
color = 1 is least color That which is claimed is:

1. A composition comprising a chelated titanium catalyst, of the type known to be useful in catalyzing the cure of alkoxy endblocked polydiorganosiloxane in the presence of moisture, and an additive selected from the group consisting of organomercaptan of the formula RSH, where R is a hydrocarbon radical containing from 3 to 12 carbon atoms, and mercapto containing silane of the formula HSR'SiX$_3$, where R' is a divalent hydrocarbon having from 1 to 8 carbon atoms and X is alkoxy radical having 1 to 6 carbon atoms.

2. The composition of claim 1 in which the additive is an organomercaptan of the formula RSH where R is a hydrocarbon radical containing from 3 to 12 carbon atoms.

3. The composition of claim 2 in which the organomercaptan is dodecylmercaptan.

4. The composition of claim 1 in which the additive is a mercapto containing silane of the formula HSR'SiX$_3$, where R' is a divalent hydrocarbon having from 1 to 8 carbon atoms and X is alkoxy radical having 1 to 6 carbon atoms.

5. The composition of claim 4 in which the mercapto containing silane is mercaptopropytrimethoxysilane.

* * * * *